3,042,726
INHIBITED POLYMERIZABLE COMPOSITIONS
Richard Edward Cook, Epsom, England, assignor to The Distillers Company Limited, Edinburgh, Scotland
No Drawing. Filed Apr. 26, 1960, Ser. No. 24,679
Claims priority, application Great Britain June 24, 1959
4 Claims. (Cl. 260—652.5)

The present invention relates to inhibited polymerizable compositions and in particular to inhibited polymerizable compositions containing chloroprene.

Many inhibitors which prevent the unwanted polymerization of various monomers are known but they vary as to the monomers with which they are effective and as to the conditions under which they act.

An object of the present invention is to provide a composition containing chloroprene in which an inhibitor is present which substantially prevents polymerization of the monomeric material when stored in the dark under an inert atmosphere. A further object is to provide a composition containing chloroprene and an inhibitor which is effective when in contact with stainless steel.

Accordingly the present invention is a composition comprising chloroprene and at least 0.001% by weight of the chloroprene of ammonium N-nitroso-phenylhydroxylamine or a homologue thereof. The present invention is further a method of storing chloroprene which comprises keeping the chloroprene in the dark in an inert atmosphere in the presence of at least 0.001% by weight of the chloroprene of ammonium N-nitroso-phenylhydroxylamine or a homologue thereof.

Ammonium N-nitroso-phenylhydroxylamine is preferred but homologues in which the aromatic ring contains alkyl group substituents can be employed.

In order to effect noticeable inhibition of polymerization the ammonium N-nitroso-phenylhydroxylamine or homologue should be present in an amount corresponding to at least 0.001% by weight of the chloroprene. Preferably greater quantities than the minimum quantity should be employed and most suitably the polymerization of pure chloroprene is inhibited by saturating the liquid chloroprene at room temperature with the ammonium N-nitroso-phenylhydroxylamine or homologue.

The compositions according to the present invention show remarkable stability under a wide range of conditions under which chloroprene compositions containing other inhibitors are unstable and polymerize. For instance, it is advisable to store chloroprene in the absence of oxygen, e.g. under an inert atmosphere such as nitrogen, in order to prevent peroxidation of the chloroprene monomer which is believed to assist the formation of "popcorn" polymer. Many polymerization inhibitors, such as aromatic amines e.g. α-phenylene diamine, and catechols e.g. pyrocatechol, are not effective for chloroprene in the absence of oxygen, whereas ammonium N-nitroso-phenylhydroxylamine and its homologues are excellent polymerization inhibitors for chloroprene under an atmosphere of nitrogen.

Many known polymerization inhibitors are ineffective for chloroprene when the latter is in contact with stainless steel. Not only is the storage life of the inhibited chloroprene considerably shortened, but also the stainless steel provides sites for the growth of undesirable popcorn polymer, which in spite of the presence of known inhibitors, appears after an unpredictable but relatively short period of time. However, experiments have shown that for periods of at least six months no popcorn polymer occurs in chloroprene saturated with ammonium N-nitroso-phenylhydroxylamine or its homologues and kept in the dark under nitrogen.

Compositions according ot the present invention have the surprising advantage over similar compositions containing other polymerization inhibitors, e.g. tertiary butyl catechol, that they not only show substantially no polymerization on standing in the dark under an inert atmosphere but also, the chloroprene can be polymerized in an aqueous emulsion system at substantially the same rate, after a short induction period, as a sample of chloroprene not containing any polymerization inhibitor.

The following examples illustrate the stability of compositions according to the present invention.

*Example 1*

Two samples of chloroprene were saturated with ammonium N-nitroso-phenylhydroxylamine at room temperature and the resultant compositions were allowed to stand in the dark under nitrogen for one week at 50° C. and for 6 months at room temperature respectively. In neither case was any high polymer of the chloroprene detected. Similarly, no high polymer was observed when similar samples were allowed to stand in the dark under nitrogen in contact with stainless steel.

*Example 2*

A sample of chloroprene was saturated with ammonium N-nitroso-phenylhydroxylamine and then seeded with an active popcorn polymer seed. At the end of six months no growth of the seed had occurred. In contrast to this, the addition of an active popcorn polymer seed to uninhibited chloroprene caused complete polymerization to occur in less than two days.

*Example 3*

Samples of chloroprene were introduced into two glass tubes which were flushed with oxygen-free nitrogen and sealed. A piece of stainless steel was present in contact with the liquid in each tube and the tubes were stored at room temperature in the dark. Additionally one tube contained ammonium N-nitroso-p-tolyhydroxylamine at a concentration of 0.05 grams per 100 millilitres of chloroprene. The chloroprene in this tube showed no sign of polymerization after 10 weeks, whereas in the absence of the inhibitor the liquid chloroprene begins to thicken in less than 24 hours.

I claim:

1. A composition comprising chloroprene and at least 0.001% by weight of the chloroprene of a polymerization inhibitor selected from the group consisting of ammonium N-nitroso-phenylhydroxylamine and homologues thereof.

2. A composition as claimed in claim 1, wherein the chloroprene is saturated at room temperature with the said inhibitor.

3. A method of storing chloroprene which comprises keeping the chloroprene in the dark in an inert atmosphere in the presence of at least 0.001% by weight of the chloroprene of a polymerization inhibitor selected from the group consisting of ammonium N-nitroso-phenyl-hydroxylamine and homologues thereof.

4. A method as claimed in claim 3, wherein the chloroprene is saturated at room temperature with the said inhibitor.

References Cited in the file of this patent
UNITED STATES PATENTS

| | | |
|---|---|---|
| 2,094,367 | Missbach | Sept. 28, 1937 |
| 2,121,012 | Britton et al. | June 21, 1938 |